Patented Dec. 9, 1947

2,432,471

UNITED STATES PATENT OFFICE 2,432,471

POLYVINYL ACETAL COMPOSITIONS

Fred W. Cox, Cuyahoga Falls, Ohio, assignor to Wingfoot Corporation, Akron, Ohio, a corporation of Delaware No Drawing. Application December 29, 1942, Serial No. 470,484

2 Claims. (Cl. 260—73)

This invention relates to the stabilization of polyvinyl acetal compositions. The acetals may, for example, be obtained by treating polyvinyl alcohol with an aldehyde. Generally, only partial conversion to the acetal is effected. For instance, the commercial polyvinyl butyral resin contains about 20 per cent of hydroxy and about 2 per cent acetate groups, the balance being polyvinyl butyral. Although the invention applies to other acetals, such as polyvinyl acetal and polyvinyl propional, it will be described more particularly in connection with the stabilization of polyvinyl butyral resin because this is the most common commercially.

The stabilizer of this invention is guanidine, an alkyl- or aryl-substituted guanidine, a guanidine salt or a salt of a substituted guanidine, such as dimethyl guanidine, trimethyl guanidine, di-o-tolyl guanidine, guanidine carbonate, guanidine acetate, guanidine sulfate, dimethyl guanidine acetate, etc. Any one of these compounds when present in a small amount prevents or inhibits decomposition of the polyvinyl acetal resin when subjected to heat. In the absence of any stabilizer, the polyvinyl acetal resins decompose at elevated temperatures and discolor. The presence of one of the stabilizers of this invention prevents or retards such discoloration.

The stabilizer will usually be used in an amount equal to at least about 0.5 per cent of the polyvinyl acetal resin, and as much as 10 per cent or more may be employed. The stabilizer may be incorporated in the resin in any suitable manner. The use of the stabilizer is illustrated in the following example:

Example

Two cements—one containing 1 part of polyvinyl butyral resin in 4.6 parts by weight of alcohol and the other containing 1 part of polyvinyl butyral and 0.02 part of guanidine carbonate in 4.6 parts by weight of alcohol—were poured into glass molds, and the alcohol was allowed to evaporate. The resulting films were placed in an oven at 110° C. At the end of three hours the stabilized film was almost colorless, whereas the unstabilized film had turned yellowish. At the end of twenty-four hours the film containing the guanidine carbonate was less discolored than that to which nothing had been added.

What I claim is:

1. A composition of a polyvinyl acetal formed from polyvinyl alcohol and an aliphatic aldehyde which contains as a stabilizer for the acetal, guanidine carbonate in an amount between about 0.5% and about 10%.

2. A composition of polyvinyl butyral which contains as a stabilizer for the butyral, guanidine carbonate in an amount between about 0.5% and about 10%.

FRED W. COX.

REFERENCES CITED

The following references are of record in the file of this patent:

UNITED STATES PATENTS

| Number | Name | Date |
|---|---|---|
| 2,134,959 | Sibley | Nov. 1, 1938 |
| 2,282,026 | Bren | May 5, 1942 |
| 2,310,943 | Dorough | Feb. 16, 1943 |
| 2,332,895 | D'Alelio | Oct. 26, 1943 |